United States Patent [19]
Oyama et al.

[11] Patent Number: 6,108,329
[45] Date of Patent: *Aug. 22, 2000

[54] TELEPHONE APPARATUS USED FOR COMPUTER NETWORK TELEPHONE SYSTEM

[75] Inventors: Akimasa Oyama, Tokyo; Hidekazu Watanabe; Masahiro Asai, both of Chiba; Kazunori Ozawa, Kanagawa; Nobuhiro Tone, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/761,612

[22] Filed: Dec. 6, 1996

[30] Foreign Application Priority Data

Dec. 18, 1995 [JP] Japan ................................. 7-348400

[51] Int. Cl.$^7$ .................................................. H04L 12/56
[52] U.S. Cl. ........................................ 370/352; 379/93.24
[58] Field of Search .................................... 370/351, 352, 370/353–356, 428, 429, 401, 400, 402, 403, 404, 405, 406; 379/201, 210, 211, 212, 214, 93.17, 93.24, 88.11; 455/556, 557, 566

[56] References Cited

U.S. PATENT DOCUMENTS

| | | | |
|---|---|---|---|
| 5,062,133 | 10/1991 | Melrose | 379/94 |
| 5,341,411 | 8/1994 | Hashimoto | 379/67 |
| 5,351,237 | 9/1994 | Shinohara et al. | . |
| 5,521,719 | 5/1996 | Yamada | 358/438 |
| 5,546,448 | 8/1996 | Caswell et al. | 379/142 |
| 5,675,507 | 10/1997 | Bobo, II | 364/514 R |
| 5,726,984 | 3/1998 | Kubler et al. | 370/349 |

FOREIGN PATENT DOCUMENTS

| | | |
|---|---|---|
| 0629092 | 12/1994 | European Pat. Off. . |
| 9620553 | 7/1996 | WIPO . |
| 9638018 | 11/1996 | WIPO . |

*Primary Examiner*—Ajit Patel
*Attorney, Agent, or Firm*—Jay H. Maioli

[57] ABSTRACT

A telephone system including telephone terminals in computer networks connected via servers to transmit data containing at least audio data through the Internet. Upon receipt of information on a source terminal sent via a server, a destination terminal performs operations based on the information. For example, the destination terminal judges whether the source terminal is a previously specified terminal, and connects or does not connect itself to the source terminal in accordance with the judgement.

2 Claims, 11 Drawing Sheets

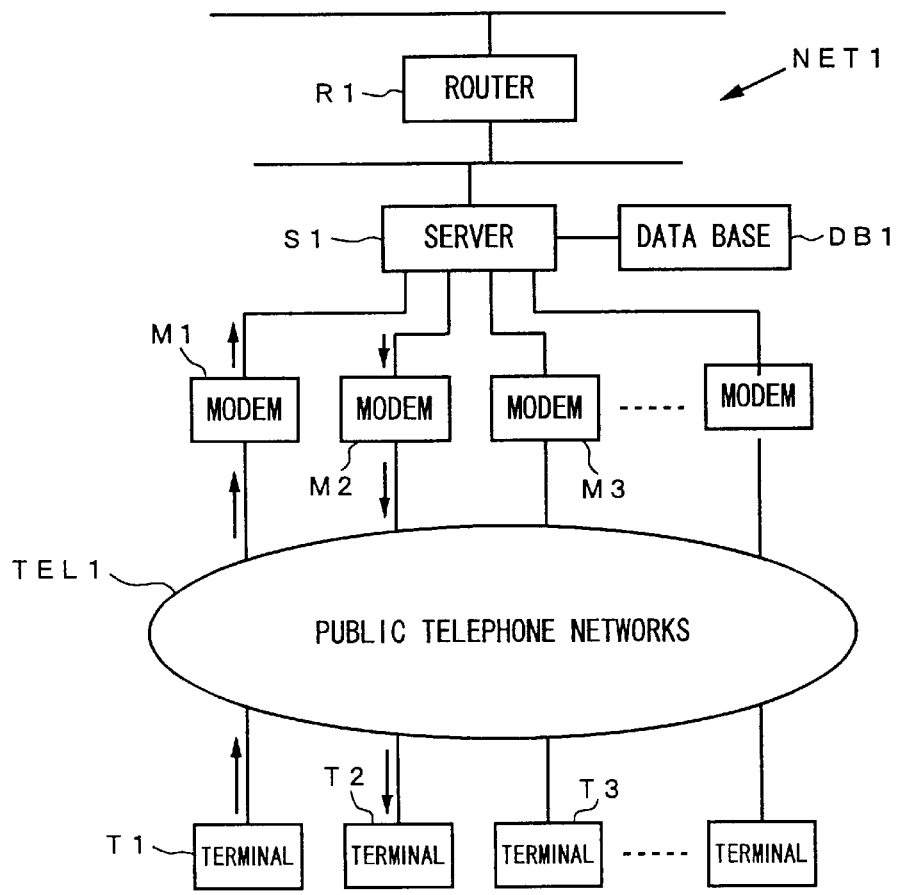

Fig. 12

```
REJECT CALL 1    xxx  —  xxx
2    xxx  —  xxx

PREFERENTIAL 1    xxx  —  xxx
2    xxx  —  xxx
```

Fig. 13

|  | FROM | MESSAGE |
|---|---|---|
| 00:00:00 | xxx | O |
| 00:00:00 | xxx |  |
| 00:00:00 | xxx | O |

TELEPHONE APPARATUS USED FOR COMPUTER NETWORK TELEPHONE SYSTEM

BACKGROUND OF THE INVENTION

1. Field of the Invention

This invention relates to a telephone apparatus of a telephone system suitable for use as an internet telephone for exchanging audio data through the internet, a worldwide computer network system.

2. Related Art

The internet is a worldwide computer network system connecting computer networks in corporations or universities beyond countries. Increasingly provided are various services using the internet, such as e-mail service, file transfer service, and information search service.

FIG. 1 schematically shows a general aspect of the internet. In FIG. 1, each of computer networks NET101, NET102, NET103, . . . has a plurality of terminals T which are connected together by LAN (Local Area Network) in form of Ethernet or a token ring.

These computer networks NET101, NET102, NET103, . . . are connected together through routers R101, R102, R103, . . . that route data from a computer network to another, depending on the destination of the data.

Computer networks NET101, NET102, NET103, . . . connected through the routers R101, R102, R103, . . . form a computer network system. The computer network system is called internet. The internet enables exchanges of data among computer networks NET101, NET102, NET103, . . .

The internet uses IP (Internet Protocol) as the protocol of its network layer. IP assigns an IP address to each terminal to identify a destination terminal of data. Each IP address is made up of four numerals each of which can be expressed by decimal 8 bits, such as 43.3.25.246.

As the internet propagates, the number of IP addresses will possibly become insufficient. In some networks in which a large number of terminals are registered but only a small number of terminals are connected simultaneously, for example, it is possible to use a server on the network to allot currently available IP addresses to actually connected terminals alone in order to minimize the number of IP addresses used. In this manner, the network need not prepare IP addresses in the number corresponding to its terminals, but can effectively use a limited number of IP addresses.

The internet uses TCP (Transmission Control Protocol) and UDP (User Datagram Protocol) as protocols of its transport layer. TCP permits communication after establishing a connection-type transmission connection, and deals with packet sequence control, retransmission, flow control and congestion control. UDP is a connectionless-type protocol that is used in lieu of TCP in networks requiring real-time transmission. In digital audio transmission, for example, retransmission is not requested even when a part of packets drops, but audio data is sent successively. In such audio transmission, UDP is used.

Thus, the internet basically uses TCP/IP protocol. That is, IP addresses are assigned to terminals of a computer network to identify individual terminals, and packets are transferred by TCP or UDP.

However, personal computers are not always connected by LAN, and there are some without IP addresses. Therefore, some individuals participating the internet use internet service providers. Through internet service providers, personal computers can be connected to computer networks and can participate the internet by, for example, PPP (Point to Point Protocol) or SLIP (Serial Line IP) through telephone lines.

FIG. 2 shows a construction of an internet service provider. The computer network NET151 of the internet service provider includes a server S151 and a router R151. The server S151 is connected to a public telephone line network TEL151 via modems M151, M152, M153, . . .

Terminals T151, T152, T153, . . . are those of individuals personally participating the internet. Terminals T151, T152, T153, . . . are connected to the public telephone line network TEL151 through modems (not shown). Individual terminals T151, T152, T153, . . . may be personal computers having serial ports.

For participation in the internet through an internet service provider, users previously make a contract with an internet service provider in most cases. When a contract is concluded between a user and an internet service provider, an account code and a password are sent to the user.

When an individual participates in the internet from one of the terminals T151, T152, T153, . . . , the user dials into the internet service provider to call up the server S151 of the computer network NET151 of the provider. The server S151 responsively requests entry of the account code and the password to confirm whether the user is a contractor. When the server S151 confirms that the entered account code and password are those of a contractor, it searches for an available IP address. If there is any IP address available, it temporarily assigns it to the terminal T151, T152, T153, or any other. Thus, the terminal obtaining the temporary IP address can connect to the internet.

In the above example, terminals are connected by PPP using telephone lines. However, ISDN (Integrated Service Digital Network) may be used alternatively. ISDN 64 includes three channels, namely, two B channels of 64 kbps and one D channel of 16 kbps. When ISDN is used, it can be used as a line of 64 kbps by sending IP packets on the B channels.

Internet telephones for effecting telephone communication using the internet are now being developed. Since the internet is basically free of charge, what is to be paid by the user for internet telephone communication through the internet is the charge based on the contract with the internet service provider and the charge for the call between the user and the internet service provider or the charge for the use of ISDN. Thus, users can enjoy long-distance telephone calls and international telephone calls very economically.

However, the most serious problem with internet telephones is that terminals of users personally participating the internet cannot be called up.

As already explained, the internet uses IP addresses for designating destination terminals. Thus, terminals of users participating the internet by PPP under contracts with the internet service provider are assigned with provisional IP addresses only when they request actual connection, but they are not always connected. Therefore, when a terminal to be PPP-connected through an internet service provider is currently out of PPP connection, the terminal cannot be accessed to for communication from other terminals.

In contrast, terminals of most LANs established in corporations or universities are assigned with their own IP addresses and always stand for actual communication. Some LANs, however, use a server for assigning IP addresses on the network so as to temporarily assign with an actually connected terminal with an available IP address (DHCP (Dynamic Host Configuration Protocol)) for the purpose of minimizing IP addresses. In such cases, also LAN terminals of corporations or universities cannot be identified definitely, and cannot be accessed to.

Conventional telephones could not avoid or reject mischievous or misdirected telephone calls that bother the users. Such annoying telephone calls possibly occur also on telephones using the internet. Telephones are therefore desired to cope with such mischievous or misdirected calls. It is also desired for telephones to store who called for what business during absence. It is also possible that telephone calls come in from ordinary public telephone lines to telephones using the internet. In this case, telephones using the internet are desired to function as ordinary telephones for telephone calls from ordinary public telephone lines.

OBJECTS AND SUMMARY OF THE INVENTION

It is therefore an object of the invention to provide a telephone apparatus available for PPP connection when it is called up from a source terminal through the internet.

Another object of the invention is to provide a terminal apparatus of a telephone system, which can obtain information on a source terminal of a telephone call through the internet and can avoid or reject mischievous or misdirected telephone calls.

Another object of the invention is to provide a terminal apparatus of a telephone system, which can store information on a source terminal of a telephone call through the internet during absence.

Another object of the invention is to provide a terminal apparatus of a telephone system, which can judge whether a telephone call is through the internet or through an ordinary public telephone line and can appropriately cope with the telephone call.

According to the invention, there is provided a telephone apparatus that can be connected to a computer network including at least one server for transmitting data containing at least an audio signal via a telephone line, the telephone apparatus including a modulator/demodulator circuit connected to a telephone line, and a control means connected to the modulator/demodulator circuit to process data containing at least the audio signal and to connect the telephone apparatus to the server when the data from the modulator/demodulator circuit is judged to be data from the computer network.

A behavior responsive to information on a source terminal is to judge whether the source terminal is one of predetermined terminals and to connect or disconnect the source terminal accordingly.

A behavior responsive to information on a source terminal is to determine a specific ring tone depending on the source terminal.

In an aspect of the invention, there is provided a terminal apparatus of a telephone system forming a computer network system in which terminals in the computer network system are connected by a server to permit transmission of data containing at least an audio data through the computer network system, the terminal apparatus comprising a public telephone connecting means enabling telephone communication through a public telephone line, and means for judging whether a telephone call comes through the computer network or through the public telephone line, so as to effect an appropriate behavior corresponding to the telephone call through the computer network or through the public telephone line.

The terminal apparatus can thus obtain information on a source terminal of a telephone call and can avoid or reject mischievous or misdirected telephone calls. When the terminal apparatus is configured to store information on the source terminal, a user can know who accessed to the terminal apparatus during absence. The terminal apparatus can also judge whether a telephone call is through the internet or through a public telephone line, and can cope with the telephone call accordingly.

BRIEF DESCRIPTION OF THE DRAWINGS

FIG. 3 is a block diagram for use in explaining an internet telephone system to which the invention is applicable;

FIG. 4 is a schematic diagram for use in explaining an internet telephone system to which the invention is applicable;

FIG. 12 is a schematic diagram for use in explaining a telephone apparatus in an internet telephone system to which the invention is applied; and FIG. 13 is a block diagram for use in explaining PPP connection.

DESCRIPTION OF THE PREFERRED EMBODIMENTS

The present invention is applied to an internet telephone for transmitting audio data through the internet, and is especially suitable for use of internet telephones connected by PPP through public telephone networks.

FIG. 3 shows an internet telephone system to which the invention is applicable. In FIG. 3, a computer network NET1 is, for example, a computer network prepared by an internet service provider. The computer network NET1 contains a server S1 and a router R1.

The server S1 is connected to a public telephone network TEL1 through modems M1, M2, M3, . . . Currently, data can be transmitted at the rate of 28.8 kbps through the public telephone network TEL1 by using a high-speed modem.

The computer network NET1 is connected to other computer networks forming the internet through the router R1. The router R1 routes data on the computer network to another computer network containing a destination terminal.

Terminals T1, T2, T3 . . . are those of individuals personally participating in the internet. Individual terminals T1, T2, T3, . . . may be personal computers installed with an internet telephone program or exclusive internet telephone apparatuses. Exclusive internet telephone apparatuses are terminals exclusive to internet telephones facilitating telephone communication using the internet as explained later.

The server S1 has a data base DB1. As shown in FIG. 4, the data base DB1 stores "terminal names", "internet names", "connection types", "public phone numbers for PPP", "users' names", and others. The data base DB1 may be established using information obtained from contents of contracts concluded between the internet service provider and users. When the connection type is PPP, the data base DB1 contains telephone numbers for PPP of users contracting with the internet service provider by PPP connection.

Although the terminals T1, T2, T3, . . . are connected to the server S1 by PPP through the public telephone network in the above example, they may be connected through a digital network such as ISDN.

Next explained is a telephone call control in a telephone system to which the invention is applied. Assume here that a telephone call from the terminal T1 to the terminal T2 is desired in FIG. 3. The internet requires an IP address to specify a destination terminal. In this case, the destination terminal T2 to be connected by PPP is normally disconnected from the computer network NET1, and cannot be accessed to through an IP address. Therefore, the data base DB1 is used.

Figure 1:
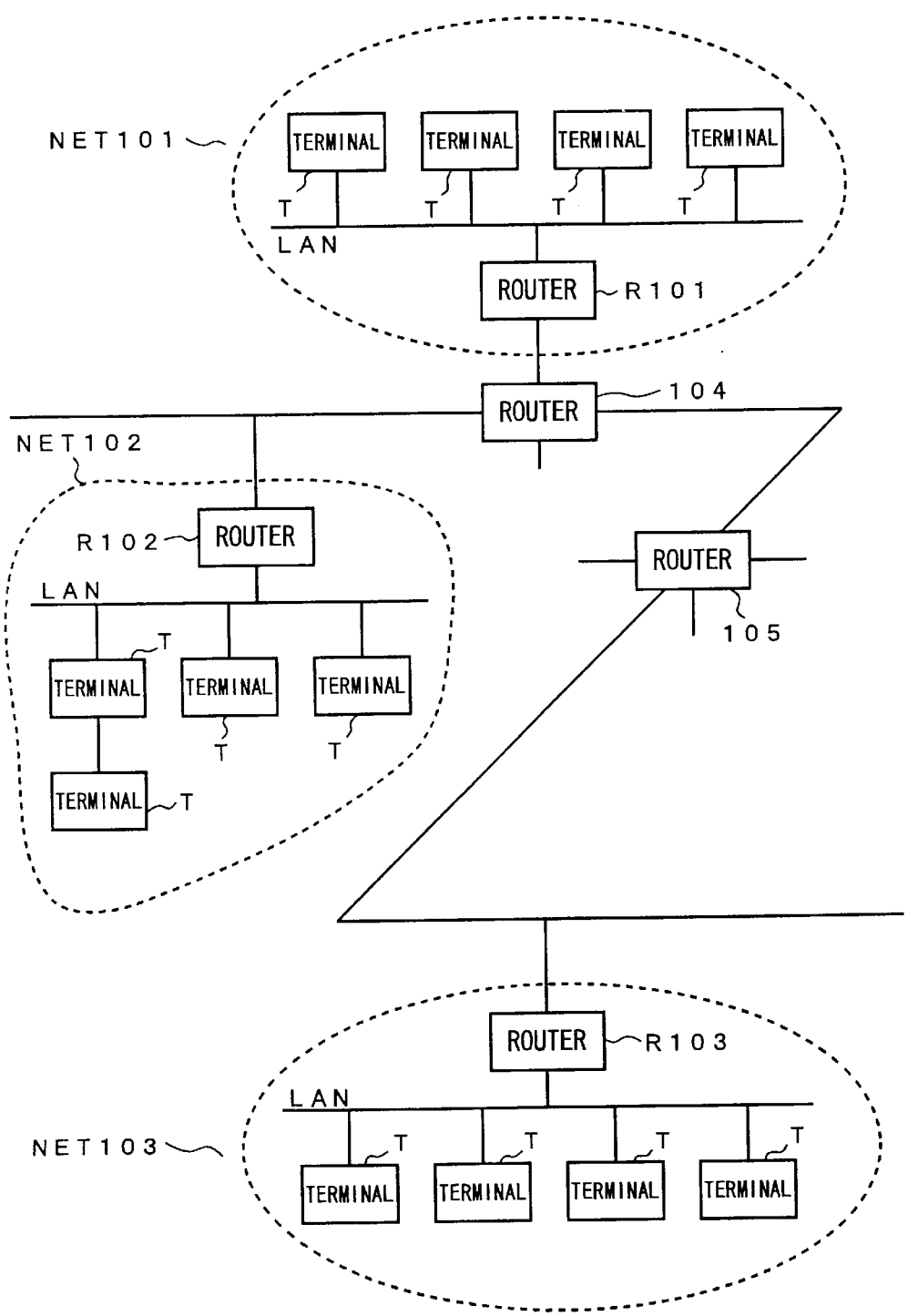
FIG. 1 is a schematic diagram for use in explaining a telephone apparatus of an internet telephone system to which the invention is applied.
Figure 2:
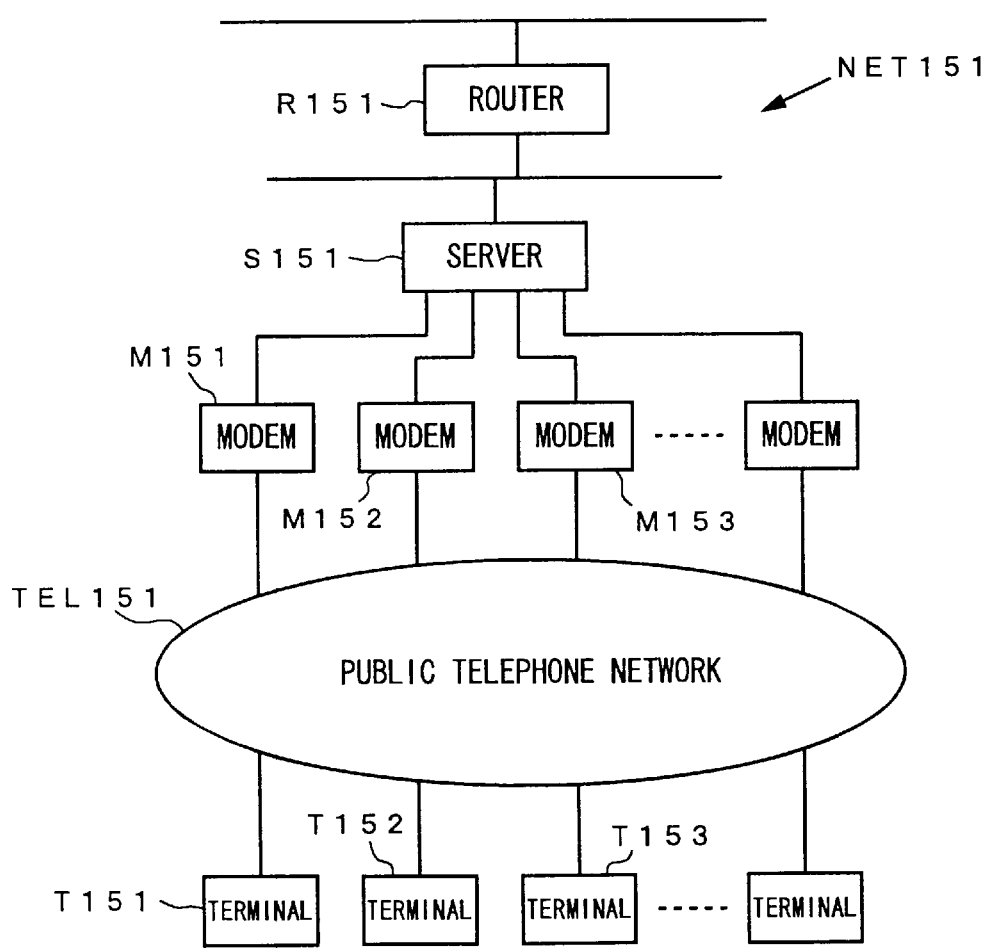
FIG. 2 is a block diagram for use in explaining the internet.
Figure 5:
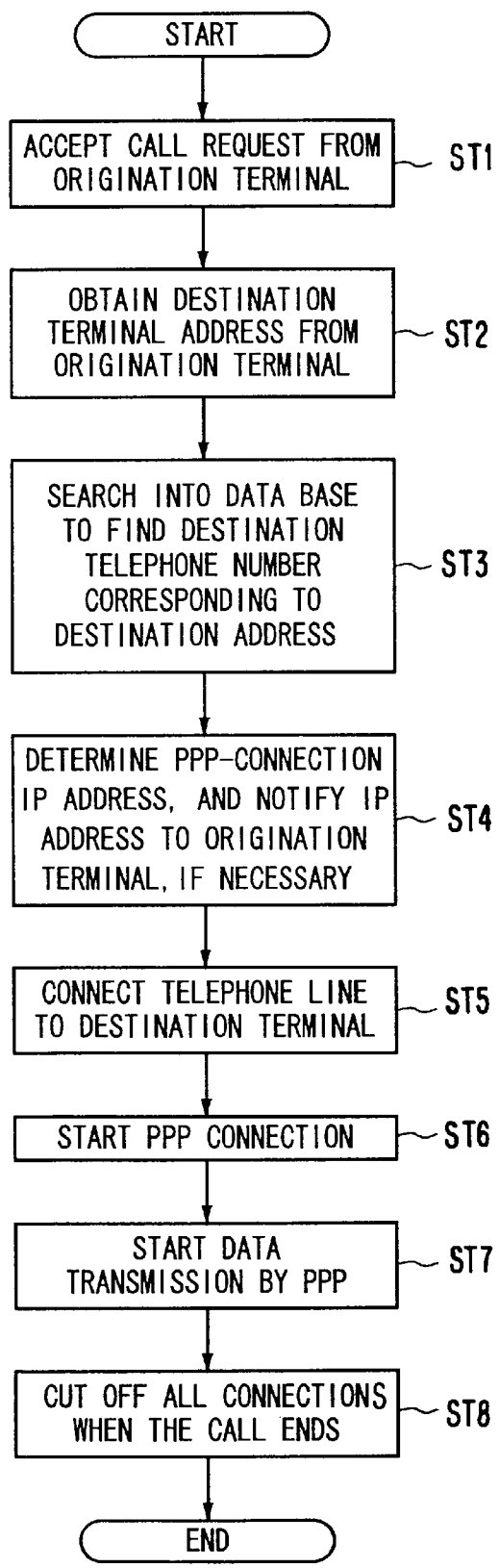
FIG. 5 is a flow chart for use in explaining an internet telephone system to which the invention is applicable.

FIG. 5 is a flow chart showing the accessing process using the data base DB1. First, the source terminal T1 dials the computer network NET1 of the internet service provider to call up the server S1 of the computer network NET1. Responsively, the server S1 requests the terminal T1 to enter its account code and the password in order to confirm whether the source terminal T1 is one of contractors of the internet service provider. The user of the source terminal T1 answers the request by entering its account code and the password. When the server S1 confirms that the entered account code and password are those of a contractor, it assigns a temporary IP address to the terminal T1. Thus, FPP connection with the terminal T1 is started (step ST1).

After that, the terminal T1 designates a desired destination address (for example, terminal T2) (step ST2).

Responsively, the server S1 searches into the data base DB1 to find out information on the terminal T2 corresponding to the requested destination address. The telephone number of the terminal T2 for PPP connection can be known from information in the data base DB1 (step ST3).

The server S1 subsequently determines an IP address for specifying the destination terminal T2 within the server to prepare for PPP connection, and gives a notice on the destination terminal's IP address to the source terminal T1 (step ST4).

Then, the server S1 dials the telephone number of the terminal T2 found out from the data base DB1 to call up the terminal T2. When connection of the telephone line to the destination terminal T2 is acknowledged, the server S1 gives approval and assigns the IP address to the destination terminal (step ST5).

PPP connection is thus started (step ST6). As a result, audio data is exchanged for communication between the terminals T1 and T2 (step ST7). The audio data is transmitted in a compressed form. For exchanging audio data, UDP is used as the protocol of the transport layer.

When the communication ends, all connections including PPP connection and telephone line connection between the terminal T1 and the server S1, and those between the terminal T2 and the server S1 are disconnected (step ST8).

Although the above example is configured to determine the IP address of the terminal T2 prior to completing access to the terminal T2, the IP address of the terminal T2 may be determined after the access to the terminal T2 is completed. It is also possible to inform the source terminal T1 of the assigned IP address, if necessary. When the source terminal is informed of the IP address at the time when the server determines the IP address of the destination terminal, the source terminal can prepare for communication with the destination terminal such that the terminals can smoothly proceed to communication.

In this manner, the data base DB1 is provided which stores information on telephone number for PPP connection, and a destination terminal is accessed through the telephone number obtained from the data base DB1 when the destination terminal is a PPP-connected terminal (T2, for example). Then, the destination terminal T2 is connected to the server S1 by PPP. Therefore, even when the destination terminal is a PPP-connected terminal, the destination terminal can be called up for communication.

Figure 6:
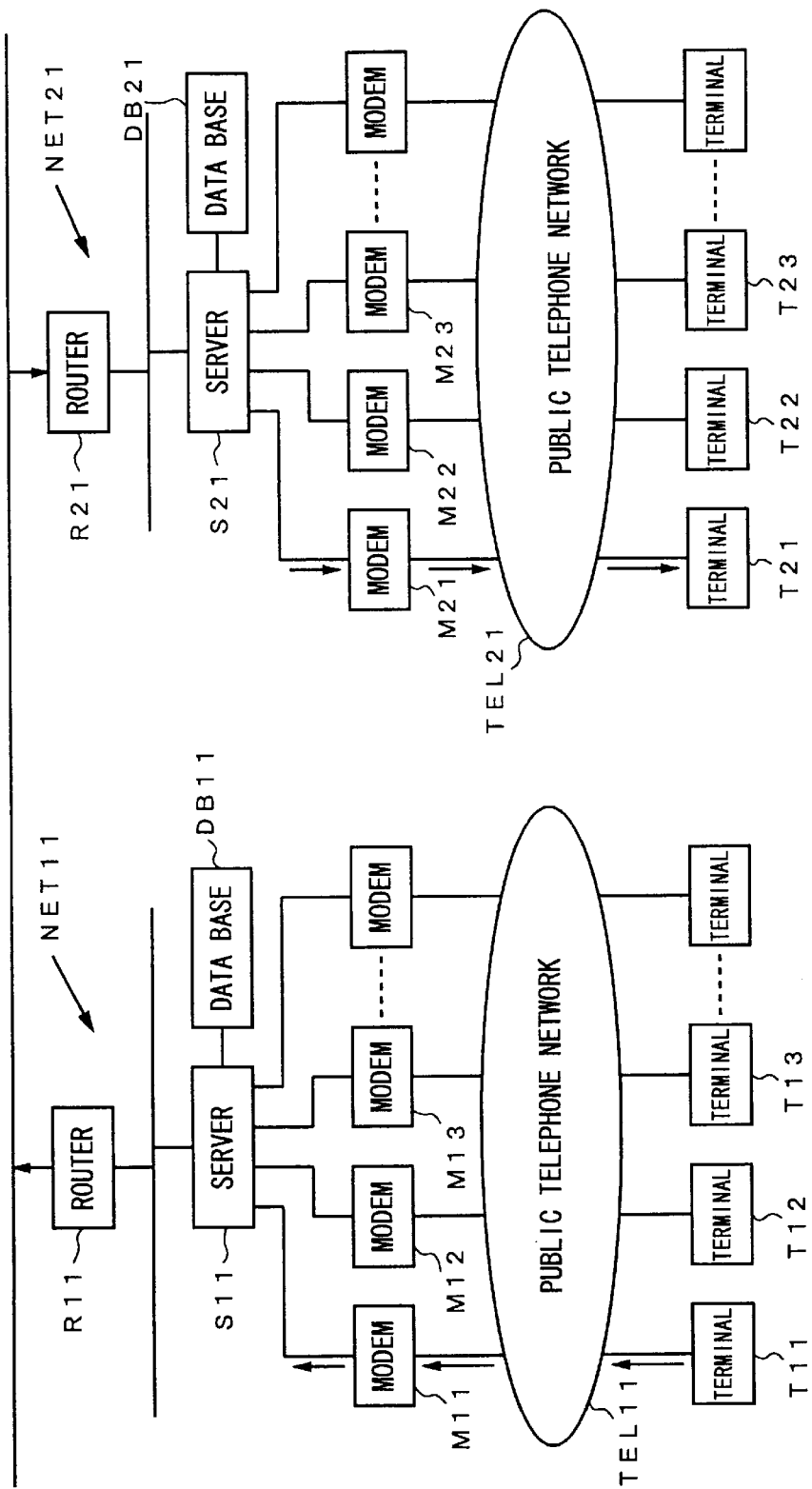
FIG. 6 is a block diagram for use in explaining another internet telephone system to which the invention is applied.

In the above example, a terminal is connected for communication with another terminal in a common computer network. However, a terminal in a computer network can be connected for communication also with a terminal in a different computer network. FIG. 6 shows an example where terminals in different computer networks are connected for communication.

In FIG. 6, a computer network NET11 is, for example, a computer network prepared by an internet service provider. The computer network NET11 contains a server S11 and a router R11. The server S11 is connected to a public telephone network TEL11 through modems M11, M12, M13, . . . The server S11 has a data base DB11. The data base DB11 stores information containing telephone numbers of terminals connected by PPP to the computer network NET11. The computer network NET11 is connected to other computer networks forming the internet through the router R11. The router R11 routes data on the computer network to an appropriate computer network containing a destination terminal. Terminals T11, T12, T13 . . . are those of individuals personally participating the internet.

A computer network NET21 is, for example, a computer network prepared by another internet service provider. The computer network NET21 contains a server S21 and a router R21. The server S21 is connected to a public telephone network TEL21 through modems M21, M22, M23, . . . The server S21 has a data base DB21. The data base DB21 stores information containing telephone numbers of terminals connected by PPP to the computer network NET21. The computer network NET21 is connected to other computer networks forming the internet through the router R21. The router R21 routes data on the computer network to an appropriate computer network containing a destination terminal. Terminals T21, T22, T23 . . . are those of individuals personally participating the internet.

Figure 7:
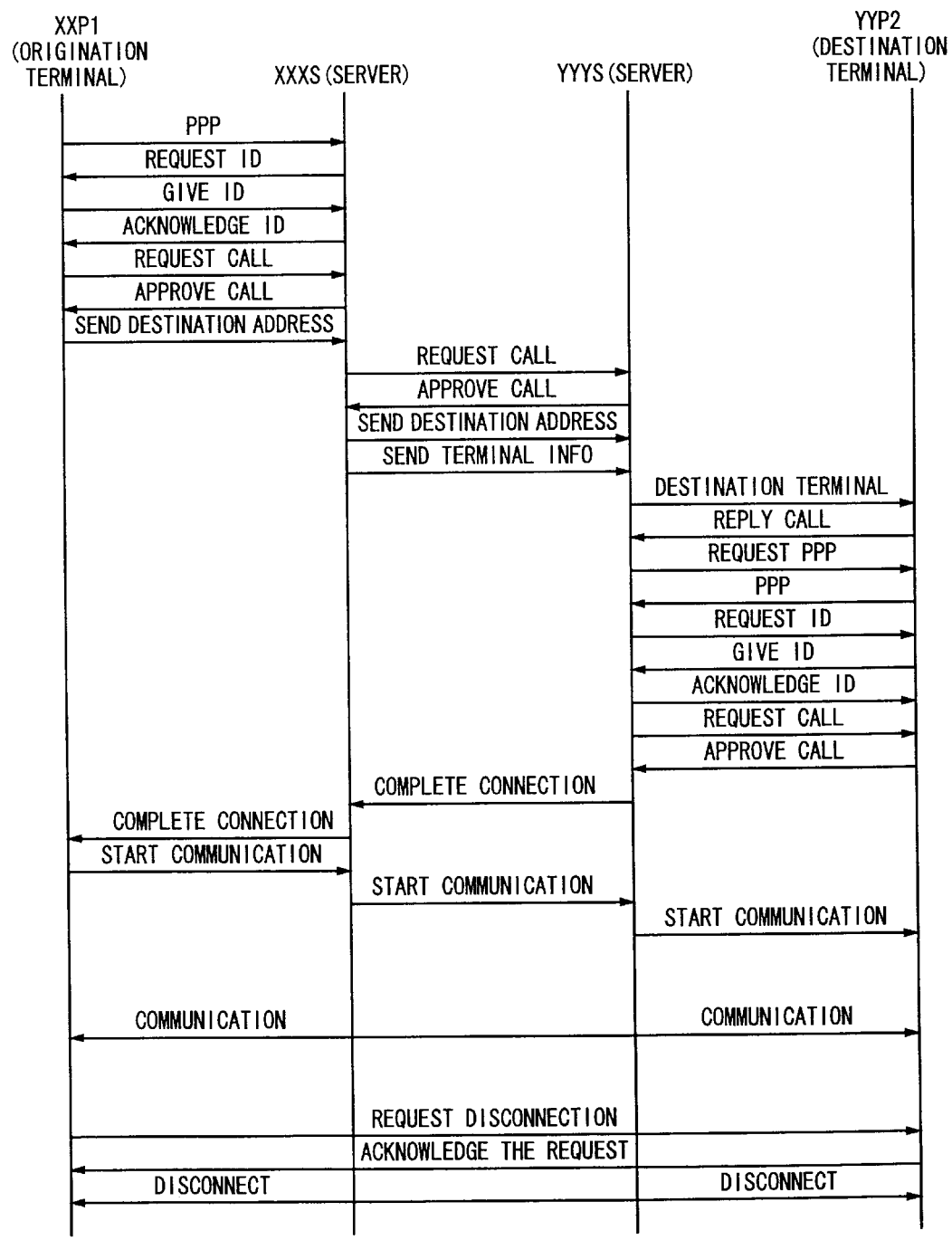
FIG. 7 is a sequence diagram for use in explaining another internet telephone system to which the invention is applicable.

Assume here that the terminal T11 desires a telephone call to the terminal T12. In this case, a process is progressed as shown in FIG. 7.

First, the source terminal T11 dials the computer network NET11 of the internet service provider to call up the server S11 of the computer network NET11. Responsively, the server S11 requests the terminal T11 to enter its account code and the password in order to confirm whether the source terminal T11 is one of contractors of the internet service provider.

The user of the source terminal T11 answers the request by entering its account code and the password. When the server S11 confirms that the entered account code and password are those of a contractor, it assigns a temporary IP address to the terminal T11. Thus, PPP connection of the terminal T11 is started.

After that, the terminal T11 sends a call request to the server S11, and the server S11 sends back a call approval. In receipt of the call approval, the terminal T11 gives a desired destination address (terminal T21, for example).

The server S11 connected to the source terminal in receipt of the destination address sends a call request for communication with the terminal T21, for example, to the server S21 of the computer network (NET21, for example) containing the destination terminal. In receipt of the call request for communication with the terminal 21, the server S21 sends back a call approval to the server S11. In receipt of the call approval, the server S11 of the network NET11 containing the source terminal sends the destination address and information on the source terminal.

The server S21 of the computer network NET21 containing the destination terminal searches into the data base DB21 to find out information on the terminal T21. The telephone number of the terminal T21 for PPP connection can be known from information of the data base DB21. The server S21 of the computer network NET21 dials the telephone number of the terminal T21 obtained from the data base DB21 to call up the terminal T21.

The destination terminal T21 accessed by the server S21 sends back an acknowledgement. The server S21 in receipt of the acknowledgement requests PPP connection, and the terminal T21 in receipt of the request for PPP connection gives confirmation of PPP connection.

The server S21 then request entry of the account code and the password to give an approval. In response to the approval, the user of the destination terminal enters the account code and the password. When the entered account code and password are confirmed to be those of a proper contractor, an IP address is assigned to the terminal T21. Thus, PPP connection of the terminal T21 is started.

When the PPP connection is started, a call request is sent from the server S21 to the terminal T21, and a call approval is sent back from the terminal T21 to the server S21. Then, the server S21 of the computer network NET21 sends a call connection completion notice to the server S11 of the computer network NET11, and the server S11 sends a call connection completion notice to the terminal T11. As a result, audio data is exchanged for communication between the terminals T11 and T21.

When a disconnection request is issued from the source terminal T11, for example, after the communication ends, the disconnection request is sent to the destination terminal T21. In receipt of the disconnection request, the terminal T21 sends back a disconnection agreement to the terminal T11, and all connections are disconnected.

The internet telephone system may use exclusive internet telephone apparatus as its terminals.

Figure 8:
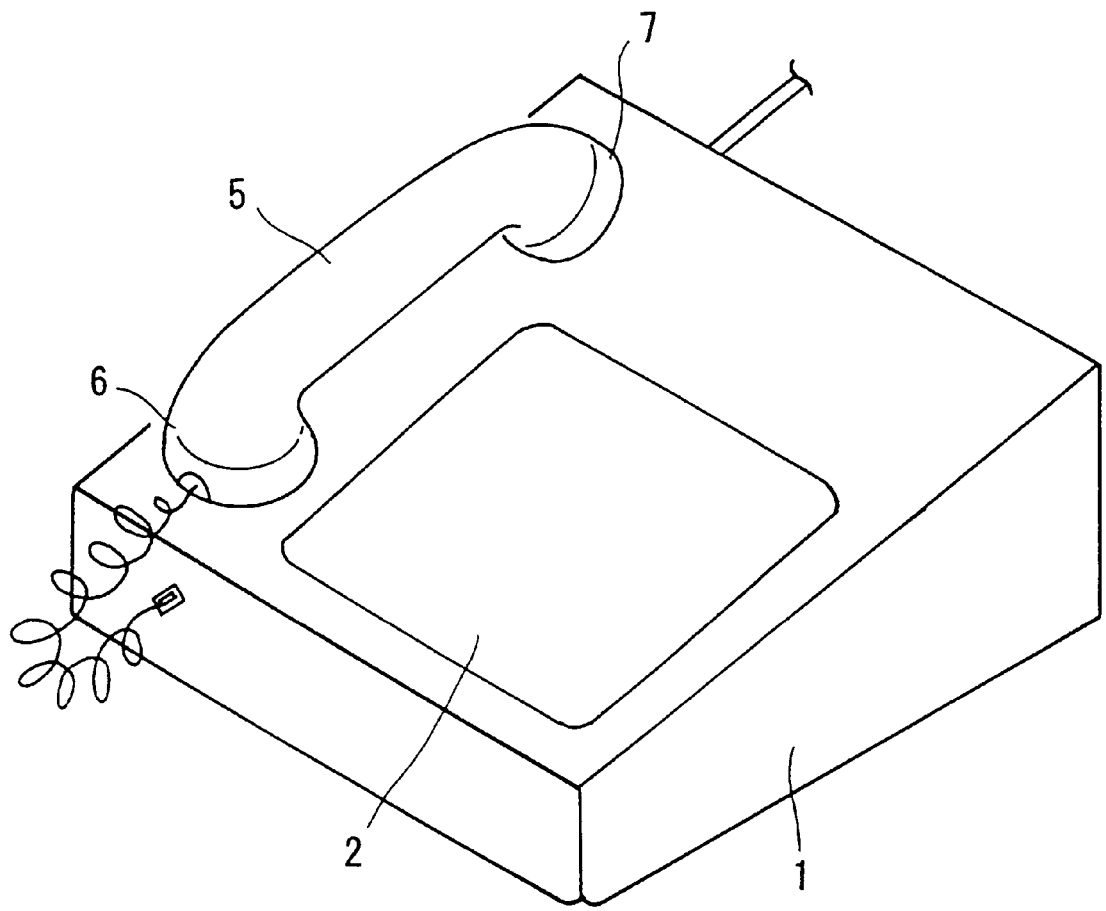
FIG. 8 is a perspective view of a telephone apparatus in an internet telephone system to which the invention is applied.
Figure 9:
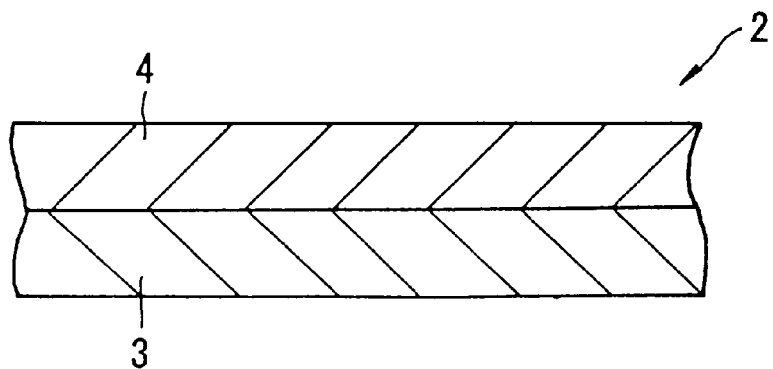
FIG. 9 is a cross-sectional view for use in explaining a telephone apparatus of an internet telephone system to which the invention is applicable.

FIG. 8 shows an internet telephone apparatus. In FIG. 8, numeral 1 denotes the main telephone body. The main telephone body 1 has a display/operator 2 on its upper surface. The display/operator 2 is a multi-layered panel including a touch panel 4 stacked on a display panel 3 as shown in FIG. 9. The display/operator 2 displays icons of numerical keys, operational keys, and so forth, which permit a user to enter a desired instruction by pressing the touch panel 4 at the portion of a corresponding icon. The display/operator 2 also displays a help message explaining how to operate the keys and the current status of the telephone apparatus in addition to key icons, etc. Other various information is also displayed on the display/operator 2. A handset 5 is connected to the main telephone body 1. The main telephone body 1 is connected to a public telephone line.

Figure 10:
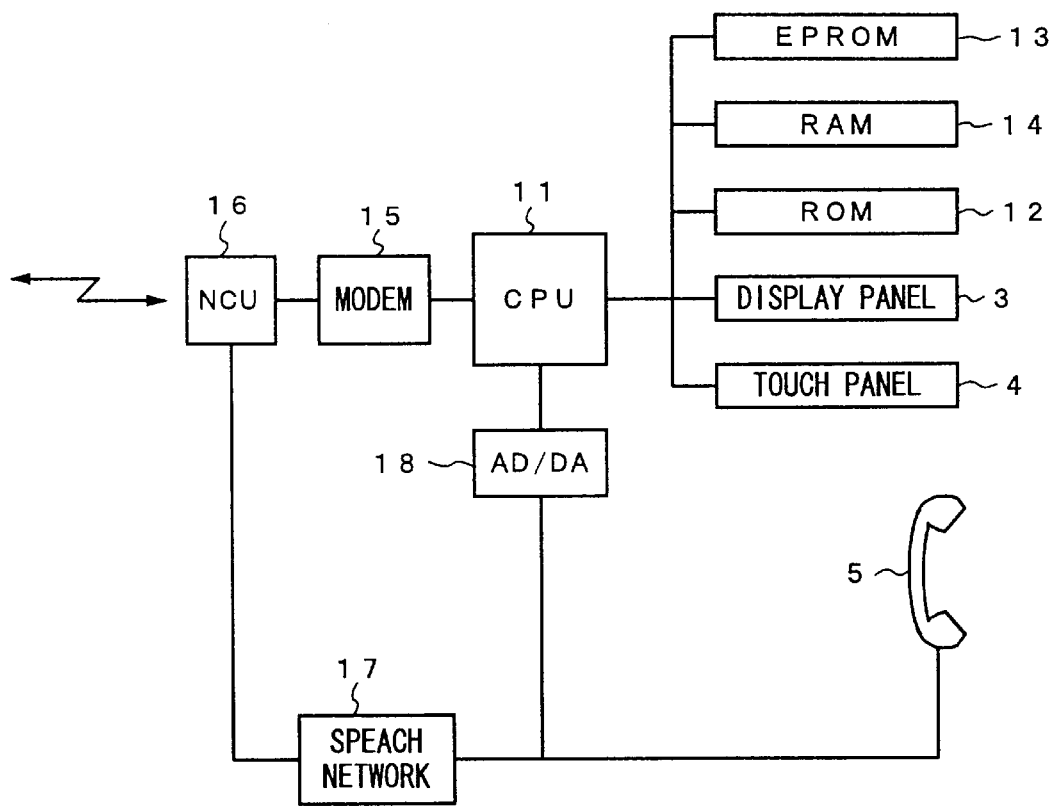
FIG. 10 is a block diagram of a telephone apparatus in an internet telephone system to which the invention is applied.

FIG. 10 shows the interior construction of the internet telephone apparatus. In FIG. 10, numeral 11 denotes a CPU. Connected to the CPU 11 are ROM 12, EPROM 13 and RAM 11. Inputs from the touch panel 4 are given to the CPU 11, and outputs from the CPU 11 are displayed on the display panel 3.

CPU 11 performs dial connection processing, data transfer processing by IP, and audio signal compression/expansion processing. That is, when CPU 11 receives a destination address and other materials entered through the touch panel 4, it controls NCU (Node Control Unit) 14 to dial the telephone number of the server of the internet service provider to perform the telephone connection processing. When the telephone connection is completed, it proceeds to PPP connection processing. In some cases, a call may arrive from the server of the internet service provider, and PPP connection is requested. Also in such cases, CPU 11 performs telephone connection processing and, after completion of telephone connection, connection processing by PPP. During communication, CPU 11 executes compression or expansion of transmitted or received audio signals, and executes transmission processing by IP.

The audio signal through the microphone of the handset 5 are converted into a digital form by an A/D and D/A converter 18. The digital audio signal is sent to CPU 11 for compression processing there. The compressed audio signal is supplied to NCU through a model 15.

The compressed audio signal sent through the telephone line is delivered to CPU 11 via NCU 16 and mode 15. CPU 11 expands the audio signal. The expanded digital audio signal is sent to the A/D and D/A converter 18 and converted into an analog form. The analog signal is supplied to the speaker of the handset 5.

The internet telephone apparatus can be used as an ordinary telephone apparatus. When it functions as an ordinary telephone apparatus, the handset 5 and NCU 14 are connected through a speech network 17 to enable communication by analog audio signals through the telephone line.

For using an internet telephone by PPP connection, a personal computer is prepared in most cases. Such a personal computer needs connection of a microphone and a speaker and needs installation of appropriate software for connection to the internet. It is difficult for users unfamiliar to computers to set a personal computer ready for connection to the internet. Moreover, a computer connected by PPP for use as an internet telephone is difficult to operate and is expensive.

The internet telephone apparatus described above does not need installation of software for connection to the internet, and can be easily connected to the internet for audio communication. Moreover, the internet telephone apparatus is equipped with the handset 5 like ordinary telephone apparatuses and can be operated in the same manner as ordinary telephone apparatuses. Therefore, even a user unfamiliar to computers can readily use the internet telephone. Especially, since the above-described internet telephone apparatus includes the display/operator 2 made by stacking the touch panel 4 on the display panel 3, its operability is good.

Also in telephones using the internet, mischievous or misdirected telephone calls may possibly come about. Thus, the internet telephone apparatuses are desired to cope with such undesired telephone calls. It is also possible that telephone calls come in from ordinary public telephone lines to telephones using the internet. Therefore, telephone apparatuses using the internet are desired to function as ordinary telephones that can answer telephone calls through ordinary telephone lines.

Figure 11A:
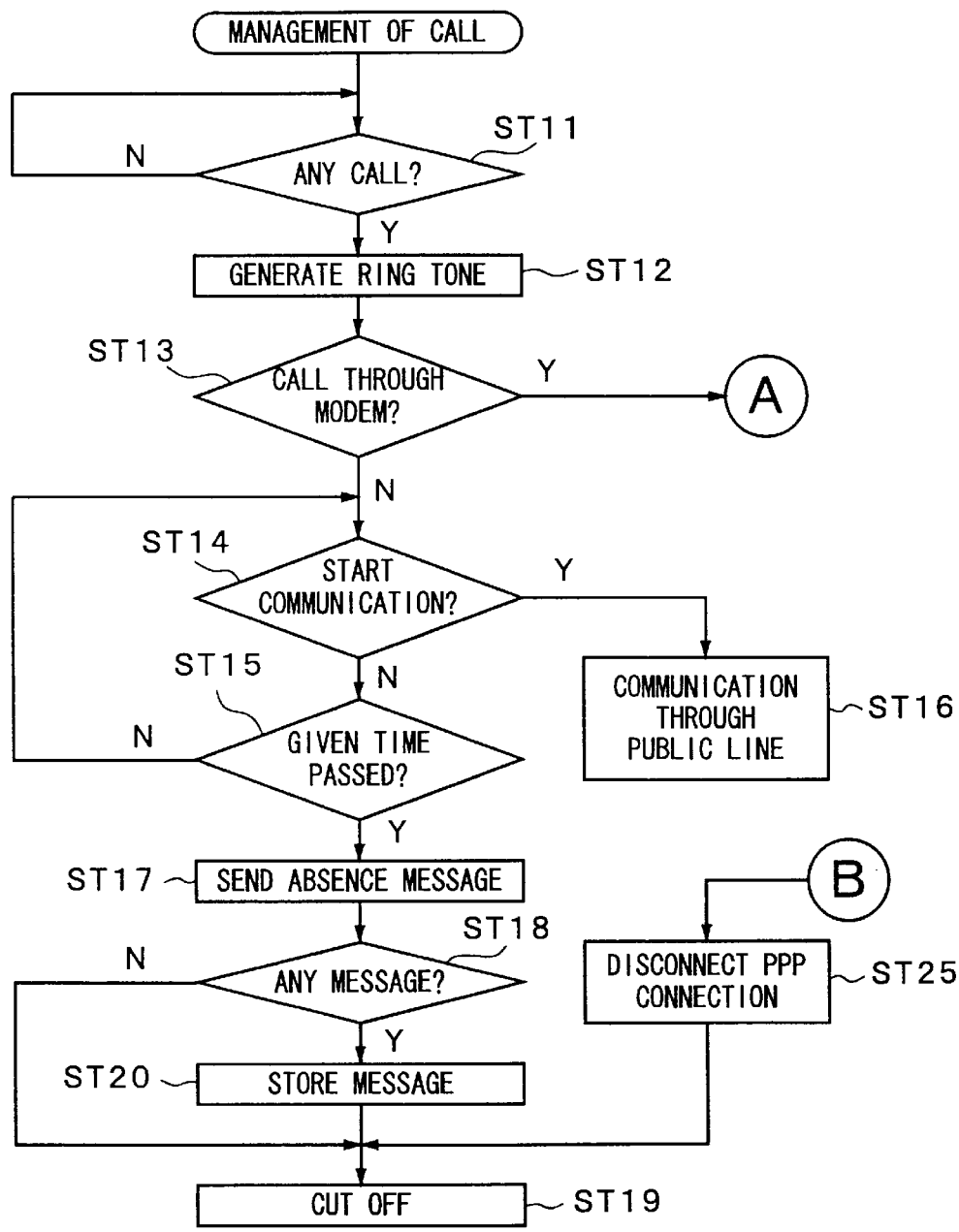
FIGS. 11A and 11B are flow charts for use in explaining a telephone apparatus in an internet telephone system to which the invention is applied.
Figure 11B:
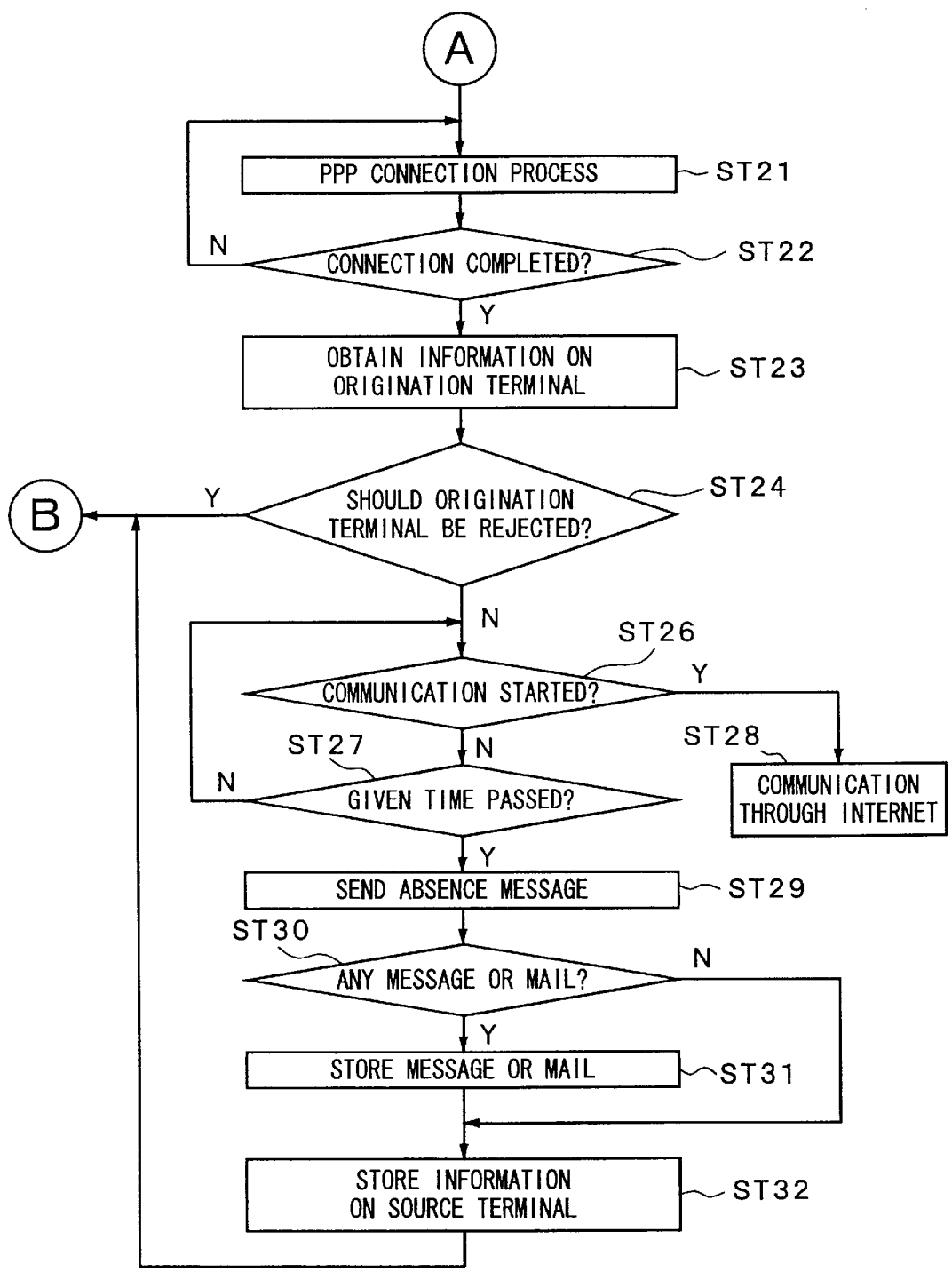

To meet the requirement, the internet telephone apparatus to which the invention is applied operates as shown in FIG. 11 in receipt of a telephone call from a source terminal.

In FIG. 11, it is judges whether the terminal is accessed to (step ST11). If so, a ring tone is generated (step ST12). It is next judged whether the telephone calls has come through a modem for the internet or through an ordinary telephone line (step ST13). A call through the modem and a call through a usual telephone can be discriminated by receiving a European calling tone from a server, for example.

In step ST13, if a call is determined to be one from an ordinary telephone, it is judged whether communication is actually started within a predetermined time (steps ST14 and ST15). If it is started within the predetermined time, the control keeps it continued (step ST16). If communication is not started within the predetermined time, an absence message is sent out (step ST17), and it is judged whether the source terminal gives any message or not (step ST18). If no message comes in, the internet telephone apparatus is cut from the telephone line (step ST19). If any message is given, it is stored (step ST20), and the internet telephone apparatus is cut from the telephone line (step ST19).

In step ST13, if the call is determined to be one through the modem, PPP connection processing as shown in FIG. 5 is carried out (step ST21). Then follows the judgement whether PPP connection processing is completed (step ST22). If so, information on the source terminal is acquired (step ST23).

The information on the source terminal is compared with call rejection information that is registered previously to know whether the source terminal is one of terminals whose calls should be rejected or not (step ST24). That is, as shown in FIG. 12, terminals whose calls should be rejected or accepted are registered previously in a call rejection list or in a call acceptance list. The information is searched into to find out whether the source terminal is one of terminals whose calls should be rejected or not.

If it is a terminal to be rejected, the line is cut off (step ST19) after PPP disconnection processing (step ST19).

In step ST24, if the call is determined to be from an acceptable terminal, it is judged whether the handset is picked up and communication is actually started within a predetermined time (step ST26). If communication is started within the predetermined time, the control keeps it continued (step ST28).

If communication is not started within the predetermined time, an absence message is sent out (step ST29), and it is judged whether there is any message or e-mail from the source terminal (step ST30). If any message or e-mail is given, it is stored (step ST31), and information on the source terminal is stored (step ST32). If no message or e-mail is given, the control jumps to step ST32 to store information on the source terminal.

Then, the control proceeds to step ST24 to cut off the line after PPP disconnection processing (step ST19).

In this manner, the internet telephone apparatus to which the invention is applied stores information on a source terminal upon receipt of a call from the model for an internet telephone call. The information is used to make a list of incoming call information as shown in FIG. 13, for example. By using the incoming call information, source terminals of respective telephone calls can be known. Information on source terminals to be stored may include names of the source terminals, countries of the source terminals, dates and times of dispatch, dates and times of arrival, and so forth. If any message or e-mail is contained, the user can hear the message or read the e-mail. It is also possible to set particular signaling sounds or melodies depending on respective source terminals. Signaling sounds, melodies, audio messages and e-mails can be combined appropriately for individual source terminals, depending on their priorities.

According to the invention, information on source terminals are obtained upon receipt of telephone calls, and mischievous or misdirected telephone calls can be avoided or rejected. Further, by storing information on source terminals, a user can know who called on during his absence. Moreover, the telephone apparatus can judge whether a telephone call is through the internet or through an ordinary public telephone line to execute appropriate processing.

What is claimed is:

1. A telephone apparatus connected through a telephone network to an internet network including a server for transmitting data containing an audio signal, wherein said server comprises a data base for storing information on each of a plurality of telephone apparatuses including said telephone apparatus, and said information includes a public phone number for point-to-point protocol and an internet protocol address, and when another of said plurality of telephone apparatuses requests to be connected to said telephone apparatus, said server finds out information on said other of said plurality of telephone apparatuses from said data base and sends said information to said telephone apparatus, said telephone apparatus comprising:

memory means for storing a list of approved user-designated callers;

a modulator/demodulator circuit connected to said server by way of said telephone network;

means for receiving a call from said other telephone apparatus and for determining whether said call is through said modulator/demodulator circuit and for processing said data after establishing a point-to-point protocol connection for data communication with said other telephone apparatus through said server upon determining that said call is through said modulator/demodulator circuit;

means for establishing a standard telephone connection for communication with said other telephone apparatus using said telephone network upon determining that said call is not through said modulator/demodulator circuit;

means for judging whether said other telephone apparatus is an approved telephone apparatus by comparing said information on said other telephone apparatus to said list of approved user-designated callers stored in said memory means;

means for connecting and disconnecting said telephone apparatus to and from said other telephone apparatus in accordance with a result of said means for judging; and means for receiving and storing an e-mail message from said other telephone apparatus when said call is not answered by a user of said telephone apparatus.

2. The telephone apparatus according to claim 1, wherein said means for determining of said telephone apparatus further determines whether said call comes from said computer network based on a ring tone.

* * * * *